(12) United States Patent
Lüneburg et al.

(10) Patent No.: US 11,525,478 B2
(45) Date of Patent: Dec. 13, 2022

(54) WIND TURBINE

(71) Applicants: THYSSENKRUPP ROTHE ERDE GMBH, Dortmund (DE); thyssenkrupp AG, Essen (DE)

(72) Inventors: Bernd Lüneburg, Mülheim (DE); Jörg Rollmann, Lippstadt (DE); Gunther Elfert, Erwitte (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 561 days.

(21) Appl. No.: 16/492,395

(22) PCT Filed: Mar. 14, 2018

(86) PCT No.: PCT/EP2018/056343
§ 371 (c)(1),
(2) Date: Sep. 9, 2019

(87) PCT Pub. No.: WO2018/167125
PCT Pub. Date: Sep. 20, 2018

(65) Prior Publication Data
US 2020/0040941 A1 Feb. 6, 2020

(30) Foreign Application Priority Data

Mar. 15, 2017 (DE) ...................... 10 2017 105 577.0

(51) Int. Cl.
*F16C 32/06* (2006.01)
*F16C 19/38* (2006.01)
(Continued)

(52) U.S. Cl.
CPC .......... *F16C 32/0666* (2013.01); *F03D 80/70* (2016.05); *F16C 19/385* (2013.01);
(Continued)

(58) Field of Classification Search
CPC ........ F16C 19/385; F16C 19/50; F16C 21/00; F16C 32/0633; F16C 32/0651;
(Continued)

(56) References Cited

U.S. PATENT DOCUMENTS 3,708,215 A 1/1973 Wilcock
3,782,793 A * 1/1974 Sinner ................ F16C 32/0666
384/99

(Continued)

FOREIGN PATENT DOCUMENTS

CH 606 793 A 11/1978
CN 104632880 A 5/2015
(Continued)

OTHER PUBLICATIONS

Machine Translation of DE-102012004329-A1 (Year: 2012).*
English Translation of International Search Report issued in PCT/EP2018/056343, dated Jun. 25, 2018.

*Primary Examiner* — Alan B Waits
(74) *Attorney, Agent, or Firm* — thyssenkrupp North America, LLC

(57) ABSTRACT

A wind turbine includes a rotor shaft. The rotor shaft is mounted via a bearing assembly having a first bearing ring and a second bearing ring mounted to rotate in relation to the first bearing ring. A hydrostatically supported first friction bearing segment is disposed on the first bearing ring and interacts with a first friction face that is disposed on the second bearing ring. The first friction bearing segment is received in a receptacle pocket of the first bearing ring such that a first compression chamber is formed between the first bearing ring and the first friction bearing segment. The first friction bearing segment is configured such that a second compression chamber is formed between the first friction bearing segment and the second bearing ring, wherein the first compression chamber and the second compression chamber are connected by a duct that runs through the first friction bearing segment.

18 Claims, 9 Drawing Sheets

(51) Int. Cl.
*F16C 19/50* (2006.01)
*F16C 21/00* (2006.01)
*F03D 80/70* (2016.01)

(52) U.S. Cl.
CPC .............. *F16C 19/50* (2013.01); *F16C 21/00* (2013.01); *F16C 32/0633* (2013.01); *F16C 32/0651* (2013.01); *F16C 32/0696* (2013.01); *F16C 2322/39* (2013.01); *F16C 2360/31* (2013.01); *F16C 2380/00* (2013.01)

(58) Field of Classification Search
CPC .............. F16C 32/0696; F16C 2322/39; F16C 2360/31; F16C 2380/00; F03D 80/70
See application file for complete search history.

(56) References Cited

U.S. PATENT DOCUMENTS

| | | | | |
|---|---|---|---|---|
| 3,799,628 A | * | 3/1974 | Van Gaasbeek | F04B 1/2042 384/12 |
| 3,827,767 A | | 8/1974 | Sinner | |
| 4,114,959 A | * | 9/1978 | Christ | F16C 32/0666 384/15 |
| 4,214,354 A | * | 7/1980 | Lehmann | F16C 13/028 492/7 |
| 6,129,453 A | | 10/2000 | Holopainen | |
| 2014/0169952 A1 | * | 6/2014 | Pedersen | F16C 17/06 415/170.1 |
| 2015/0125104 A1 | | 5/2015 | Kullin | |
| 2017/0082141 A1 | * | 3/2017 | Mtauweg | F16C 17/10 |
| 2019/0113073 A1 | | 4/2019 | Kullin | |

FOREIGN PATENT DOCUMENTS

| | | | | |
|---|---|---|---|---|
| DE | 25 57 875 A | 6/1977 | | |
| DE | 698 30 956 T | 5/2006 | | |
| DE | 199 83 059 B | 2/2009 | | |
| DE | 10 2011 008 267 A | 7/2012 | | |
| DE | 102012004329 A1 | * | 8/2013 | ............. F03D 13/20 |
| EP | 1 209 287 A | 5/2002 | | |
| EP | 1406012 A | 4/2004 | | |
| EP | 2 829 752 A | 1/2015 | | |
| EP | 2 921 728 A | 9/2015 | | |
| GB | 2 070 156 A | 9/1981 | | |

* cited by examiner

WIND TURBINE

CROSS REFERENCE TO RELATED APPLICATIONS

This application is a U.S. National Stage Entry of International Patent Application Serial Number PCT/EP2018/056343, filed Mar. 14, 2018, which claims priority to German Patent Application No. DE 10 2017 105 577.0, filed Mar. 15, 2017, the entire contents of both of which are incorporated herein by reference.

FIELD

The present disclosure generally relates to a wind turbine and bearing assembly therefor.

BACKGROUND

A bearing assembly for mounting such a rotor shaft of a wind turbine is known from DE 10 2011 008 267 A1, said bearing assembly comprising a plurality of hydrostatically supported friction bearing segments. The friction bearing segments are elastically mounted in a spherically configured circumferential face of the outer ring of said bearing assembly. To this end, the friction bearing segments are not fixedly assembled but are disposed on a mechanical or hydraulic spring so as to be displaceable in a radial and restoring manner in relation to a sealing face of the inner ring. However, in the case of such bearings which comprise a large number of friction bearing segments of this type, said mechanical or hydraulic springs for mounting the individual friction bearing segments are associated with an increased complexity in terms of assembling and servicing.

DISCLOSURE OF THE INVENTION

Thus a need exists for a wind turbine having a rotor shaft, wherein the rotor shaft is mounted by way of a bearing assembly which requires a low complexity in terms of assembling and servicing.

DETAILED DESCRIPTION

Figure 1:
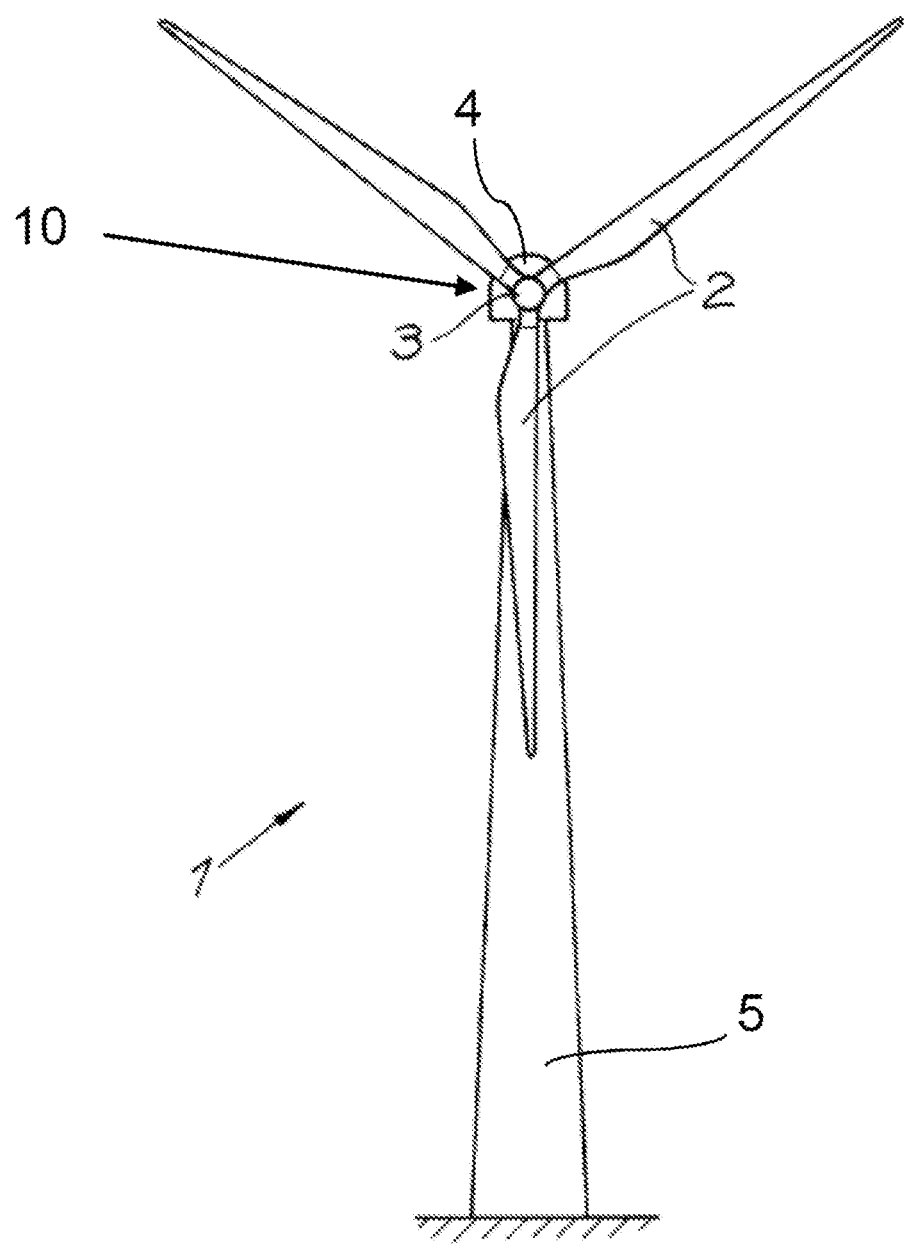
FIG. 1 is a perspective view of an exemplary embodiment of a wind turbine.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a wind turbine having a rotor shaft, wherein the rotor shaft is mounted by way of a bearing assembly having a first bearing ring and a second bearing ring that is mounted so as to be rotatable in relation to the first bearing ring, wherein at least one hydrostatically supported first friction bearing segment which interacts with a first friction face that is disposed on the second bearing ring is disposed on the first bearing ring.

In some examples, a bearing assembly having a first bearing ring and a second bearing ring may be mounted so as to be rotatable in relation to the first bearing ring, wherein at least one hydrostatically supported first friction bearing segment which interacts with a first friction face that is disposed on the second bearing ring is disposed on the first bearing ring, wherein the first friction bearing segment is received in a receptacle pocket of the first bearing ring in such a manner that a first compression chamber is formed between the first bearing ring and the first friction bearing segment, and the first friction bearing segment is configured in such a manner that a second compression chamber is formed between the first friction bearing segment and the second bearing ring, wherein the first compression chamber and the second compression chamber are connected by way of a duct that runs through the first friction bearing segment is proposed.

In the case of the bearing assembly according to the invention, a first compression chamber is formed between the first bearing ring and the first friction bearing segment. A pressure in the first compression chamber which pushes the first friction bearing segment in the direction of the first friction face of the second bearing ring and acts as a spring/damper system can be generated by directing a lubricant into the first compression chamber. A second compression chamber in which a lubricant film having a lubricant gap width can be configured is formed between the first friction bearing segment and the second bearing ring, in particular the friction face of the second bearing ring. The first and the second compression chamber are connected by a duct that runs through the first friction bearing segment such that the second compression chamber can be supplied with lubricant by way of the duct. A pressure equalization between the first compression chamber and the second compression chamber can take place by way of the duct. In the case of the bearing assembly according to the invention, it is not necessary for separate springs to be provided for elastically mounting the first friction bearing segments. Less complexity in terms of assembling and servicing results. Furthermore, the damping of undesirable vibrations can be enabled by way of the bearing assembly according to the invention such that improved smooth running can be obtained.

The first friction bearing segment preferably does not extends across the entire circumference of the first bearing ring. This means that the first friction bearing segment in the circumferential direction of the first bearing ring preferably does not extend across the entire bearing ring.

The first bearing ring can be an inner ring and the second bearing ring can be an outer ring of the bearing assembly. Alternatively, the first bearing ring can be an outer ring and the second bearing ring can be an inner ring. Either the first bearing ring or the second bearing ring can be configured as a split bearing ring having a plurality of bearing ring parts in order for the assembling of the bearing assembly to be simplified. For example, the second bearing ring can be configured in one piece, and the first bearing ring can be split in an axial direction, thus in a direction parallel to the rotation axis. Alternatively, the first bearing ring can be configured in one piece, and the second bearing ring can be split in the axial direction.

According to one preferred design embodiment of the invention, a plurality of hydrostatically supported first friction bearing segments which are mutually spaced apart in a circumferential direction of the first bearing ring and interact with a first friction face that is disposed on the second bearing ring are disposed on the first bearing ring. The lubricant gap on the friction bearing segments that separates the bearing rings can adjust itself individually on account of the plurality of friction bearing segments that are disposed so as to be mutually spaced apart along the circumferential direction. It is therefore possible for a variable width of the lubricating gap in the circumferential direction that is created by asymmetrical stress to be counteracted such that a lubricant gap which is ideally uniform across the circumferential direction and has a reduced lubricant throughput is obtained. All of the first friction bearing segments are preferably of identical configuration. The first friction bearing segments particularly preferably form a first row of friction bearing segments that runs in the circumferential direction, wherein the first friction bearing segments interact with the same first friction face. Alternatively, the first friction bearing segments can be of dissimilar configuration. For example, the first friction bearing segments can comprise dissimilar cross sections and/or surfaces of dissimilar sizes that are effective in relation to the friction face.

According to one advantageous design embodiment of the invention the first friction bearing segment comprises a first pressure surface which faces the first compression chamber, and a second pressure surface which faces the second compression chamber, wherein the first pressure surface is smaller than the second pressure surface. On account of dimensioning the pressure surfaces in this manner it can be achieved in the case of identical pressure in the first compression chamber and the second compression chamber that the force acting on the second pressure surfaces is greater than the force acting on the first pressure surface. The friction bearing segment is therefore pushed away in a self-acting manner from the friction face of the second bearing ring, on account of which the pressure in the second compression chamber on account of outflowing lubricant decreases until an equilibrium of force between the two forces is reached. The friction bearing segment in the state of equilibrium can assume a position at which an adequate lubricant gap is present as a separation between the friction bearing segment and the friction face. It can be prevented on account thereof that the friction bearing segment undesirably comes to lie against the friction face on the second bearing ring, so that a wear-free operation is enabled. A design embodiment of this type is advantageous for large bearing assemblies, in particular having a diameter in the range from 1 m to 10 m. By virtue of production tolerances or stress-related deformations, the width of the lubricant gap in the case of large bearing assemblies often varies in the circumferential direction. The functional capability of bearing assemblies of this type can be guaranteed on account of the friction bearing segment that in a self-acting manner moves to the state of equilibrium.

A plurality of second compression chambers can also be provided instead of a single second compression chamber. In the case of design embodiments of the invention that have a plurality of second compression chambers, the sum of the pressure surfaces of the plurality of second compression chambers is preferably larger than the first pressure surface. The ratio of the first pressure surface to the second pressure surface, or to the sum of the plurality of second pressure surfaces, respectively, is thus less than 1 and is preferably in the range between 0.5 and 1, particularly preferably in the range between 0.7 and 1.

The second pressure surface of the first friction bearing segment is preferably delimited by a peripheral protrusion such that any lateral leakage of the lubricant from the second compression chamber is impeded. The peripheral protrusion can be disposed so as to completely encircle the pressure surface. The peripheral protrusion preferably comprises a curvature, the profile of said curvature being adapted to the curvature of the friction face of the second bearing ring. The curvature of the peripheral protrusion and of the friction face are particularly preferably identical such that the peripheral protrusion in the event of a stoppage of the bearing assembly lies against the friction face.

According to one advantageous design embodiment of the invention a cross-sectional constriction, in particular a flow throttle, is disposed in the duct. The exchange of lubricant between the first compression chamber and the second compression chamber, that is to say between the front side and the rear side of the friction bearing element, can be adjusted by way of the cross-sectional constriction. The cross-sectional constriction is preferably configured in such a manner that an adequately dimensioned lubricant gap is present between the friction bearing segment and the friction face of the second bearing ring.

It is advantageous for a sealing element to be disposed between the friction bearing segment and the first bearing ring, in particular the receptacle pocket, such that any undesirable outflow of lubricant from the first compression chamber, that is to say from the rear side of the friction bearing segment about the latter, can be prevented. It can be achieved on account of the sealing element that an exchange of lubricant can take place substantially, preferably exclusively, by way of the duct of the friction bearing segment.

According to one advantageous design embodiment it is provided that the first friction bearing segment is configured in such a manner that a plurality of second compression chambers, in particular three or four second compression chambers, are formed between the first friction bearing segment and the second bearing ring, wherein the first compression chamber and the plurality of second compression chambers are connected by way of a plurality of ducts that run through the first friction bearing segment. The friction bearing segment on that side thereof that faces the friction face of the second bearing ring can comprise a plurality of protrusion which form lateral delimitations for a plurality of, in particular three or four, second compression chambers. Any undesirable tilting of the friction bearing segment in relation to the second bearing ring can be minimized on account of the plurality of second compression chambers that are formed between the first friction bearing segment and the second bearing ring. This means that contact with the second bearing ring by a tilted friction bearing segment can be prevented in the event of a malfunction in the pressure supply, for example a loss of pressure.

In this context it is preferable that a cross-sectional constriction, in particular a flow throttle, is disposed in each duct such that the exchange of lubricant between the first compression chamber and the other compression chambers, in particular a second, third, fourth, and fifth compression chamber, can be adjusted. The cross-sectional constrictions are preferably configured in such a manner that an adequately dimensioned lubricant gap is present between the friction bearing segment and the friction face of the second bearing ring. The cross-sectional constrictions can be of dissimilar configurations.

According to one advantageous design embodiment at least one hydrostatically supported second friction bearing segment which interacts with a second friction face that is disposed on the second bearing ring is disposed on the first bearing ring. The second friction face is preferably spaced apart from the first friction face in the axial direction.

According to one preferred design embodiment, a plurality of hydrostatically supported second friction bearing segments which are mutually spaced apart in a circumferential direction of the first bearing ring and interact with a second friction face that is disposed on the second bearing ring are disposed on the first bearing ring. The second friction bearing segments preferably form a second row of friction bearing segments that runs in the circumferential direction, wherein first row of friction bearing segments the second row of friction bearing segments are mutually spaced apart in an axial direction that runs parallel to a rotation axis of the bearing assembly. All of the second friction bearing segments are preferably of identical configuration. It is advantageous for the first friction bearing segments and the second friction bearing segments to be of identical configuration. A third row of friction bearing segments having third friction bearing segments, or further rows of friction bearing segments having corresponding friction bearing segments, can optionally be provided.

In this context, it is advantageous for the first friction bearing segments and the second friction bearing segments to disposed so as to be asymmetrical in terms of a radial plane that is disposed so as to be perpendicular to a rotation axis of the bearing assembly. In the case of a stationary disposal of the first bearing ring, a design embodiment of this type enables an adaptation to non-symmetrical effects of forces to be anticipated. It is preferable for the first row of friction bearing segments to comprise a first annular-segment-shaped region having a plurality of first friction bearing segments, and a second annular-segment-shaped region in which no first friction bearing segments are disposed, and for the second row of friction bearing segments to comprise a third annular-segment-shaped region which has a plurality of second friction bearing segments, and a fourth annular-segment-shaped region in which no second friction bearing segments are disposed, wherein the first annular-segment-shaped region and the third annular-segment-shaped region are disposed so as not to be symmetrical in relation to the radial plane. Alternatively, it is possible that the second friction bearing segments in relation to the first friction bearing segments comprise an offset in the circumferential direction.

The first friction bearing segment and/or the second friction bearing segment preferably comprise/comprises a circular cross section. To this extent, the first pressure surface and/or the second pressure surface of the corresponding friction bearing segment can be circular. Alternatively, the first friction bearing segment and/or the second friction bearing segment can comprise an elliptic or angular, for example a triangular, quadrangular, or polygonal, cross section.

According to one advantageous design embodiment, the first friction bearing segment and/or the second friction bearing segment are/is formed from bronze. Alternatively, the first and/or the second friction bearing segment can comprise a coating from white metal.

According to one advantageous design embodiment the bearing assembly comprises at least one row of rolling elements having a plurality of rolling elements which are disposed so as to be capable of rolling on a first raceway of the first bearing ring and on a second raceway of the second bearing ring. A design embodiment of this type represents a hybrid bearing assembly having at least one roller bearing and at least one hydrostatic friction bearing. In the case of such bearing assemblies, the first raceway for the rolling elements of the first row of rolling elements as well as the friction bearing segments are disposed on the first bearing ring. The second raceway for the rolling elements as well as the friction face for interacting with the friction bearing segments are provided on the second bearing ring. To this extent, a rigid bearing in which forces are capable of being transmitted between the first and the second bearing ring by way of the rolling elements, or the hydrostatic friction mounting, respectively, is formed. The hydrostatic friction bearing segments can transmit forces between the bearing rings even in the event of a stoppage or at low rotating speeds of the bearing rings. In the event of a failure of the lubricant supply to the hydrostatic friction bearing segments, the forces can be transmitted exclusively by way of the rolling elements such that a pure roller-bearing operation is at least temporarily possible.

According to one advantageous design embodiment, the first bearing ring is configured as a stationary bearing ring, and the second bearing ring is rotatable in relation to the first bearing ring.

The first friction face and/or the second friction face is/are preferably designed so as to be cylindrical.

The rolling elements are preferably configured as tapered rollers. Alternatively, the rolling elements can be configured as balls, cylindrical rollers or barrel rollers. The bearing assembly can optionally comprise a plurality of rows of rolling elements, each having a plurality of rolling elements, which are disposed so as to be capable of rolling on further raceways of the first bearing ring and on further raceways of the second bearing ring. The rows of rolling elements are preferably disposed in such a manner that the bearing assembly forms an axial/radial bearing which can receive forces in the axial direction as well as in the radial direction. The rotation axes of the rolling elements of the rows of rolling elements are preferably disposed so as to be inclined in relation to the axial direction as well as in relation to the radial direction such that the rolling elements can received forces in the radial direction and the axial direction. Alternatively, the rotation axes of the rolling elements of a first row of rolling elements can be aligned in the axial direction, and the rotation axes of the rolling elements of a second row of rolling elements can be aligned in the radial direction.

The first bearing ring of the bearing assembly is preferably configured as a stationary bearing ring. For example, the first bearing ring can be connected to a support structure of the wind turbine, for example to a nacelle of a wind turbine. The second bearing ring is preferably connected in a rotationally fixed manner to the rotor shaft.

A wind turbine 1 which comprises a tower 5 and a nacelle 4 that is disposed so as to be rotatable in relation to the tower 5 is shown in FIG. 1. A rotor 3 is rotatably mounted on the nacelle 4 by a rotor shaft. The rotor shaft is mounted by way of a bearing assembly 10 according to the invention. A first bearing ring 11 of the bearing assembly 10 herein is configured as a stationary bearing ring. A second bearing ring 12 which is rotatable in relation to the first bearing ring 10 is connected in a rotationally fixed manner to the rotor shaft. A plurality of rotor blades 2 are provided on the rotor 3.

The bearing assembly 10 is configured as a large roller bearing having a diameter in the range from 1 m to 10 m, preferably from 3 m to 7 m, particularly preferably from 4 m to 6 m, for example 2.5 m. Various exemplary embodiments of bearing assemblies 10 which connect the rotor 3 so as to be rotatable on the nacelle 4 are to be described hereunder.

FIGS. 2 to 5 show a first exemplary embodiment of a bearing assembly 10 according to the invention, having a first stationary bearing ring 11 which is configured as an inner ring. In order for the assembling of the bearing assembly 10 to be simplified, the first bearing ring is configured as a bearing ring that is split in the axial direction A and comprises a plurality of bearing parts 11.1, 11.2, 11.3. The bearing assembly 10 furthermore comprises a second bearing ring 12 which is configured as an outer ring and which in relation to the first bearing ring 11 is mounted so as to be rotatable about a rotation axis D. The second bearing ring 12 concentrically surrounds the first bearing ring 11. Two rows of roller bearings 13, 14 are disposed between the bearing rings 11, 12. Each of the rows of roller bearings 13, 14 comprises a plurality of rolling elements 15, 16 which are disposed so as to be mutually spaced apart. The spacing between the rolling elements can be adjusted by spacers (not illustrated in the drawing) or a cage. The rolling elements 15, 16 of the rows of rolling elements 13, 14 are disposed in such a manner that said rolling elements 15, 16 are disposed so as to be capable of rolling on a first raceway 11.4, 11.5 of the first bearing ring 11 and on a second raceway 12.1, 12.2 of the second bearing ring 12. The rolling elements 15, 16 of the rows of rolling elements 13, 14 are tapered rollers. The rolling elements 15, 16 of the rows of rolling elements are of identical configuration. The rows of rolling elements 13, 14 are disposed in such a manner that the bearing assembly forms an axial/radial bearing which can receive forces in the axial direction A as well as in the radial direction R. According to the exemplary embodiment, the rotation axes of the rolling elements 15, 16 are disposed so as to be inclined in relation to the axial direction A as well as in relation to the radial direction.

The bearing assembly 10 is a hybrid bearing assembly which in addition to the rows of rolling elements 13, 14 comprises a plurality of rows of friction bearing segments that are formed from friction bearing segments 21, 22, 23, wherein the rolling elements 15, 16 as well as the friction bearing segments interact with the second bearing ring 12. A first row of friction bearing segments is formed from a plurality of first friction bearing segments 21 which are disposed and hydrostatically supported on the first bearing ring 11 and which are mutually spaced apart in a circumferential direction of the first bearing ring 11. The first friction bearing segments 21 interact with a first friction face 12.3 that is disposed on the second bearing ring 12, wherein a lubricating gap which is filled with a lubricant, for example an oil, is configured between the first friction bearing segments 21 and the first friction face 12.3. The first friction face 12.3 is designed so as to be cylindrical. The lubricant is actively fed by way of a lubricant supply system, for example an oil pump. The infeeding of the lubricant is performed by way of an infeed duct 17 in the first bearing ring 11, said infeed duct 17 opening out in a receptacle pocket 11.6 in the first bearing ring 1. The hydrostatic friction bearing segments 21 transmit forces between the bearing rings 11, 12 even in the event of a stoppage or at low rotating speeds of the bearing rings 11, 12. Since a plurality of friction bearing segments 21 are disposed so as to be disposed in a spaced apart manner along the circumferential direction, a lubricant gap can adjust itself individually on the friction bearing segments such that a lubricant gap which is homogenized across the circumferential direction and which has a reduced lubricant throughput is obtained.

Figure 8:
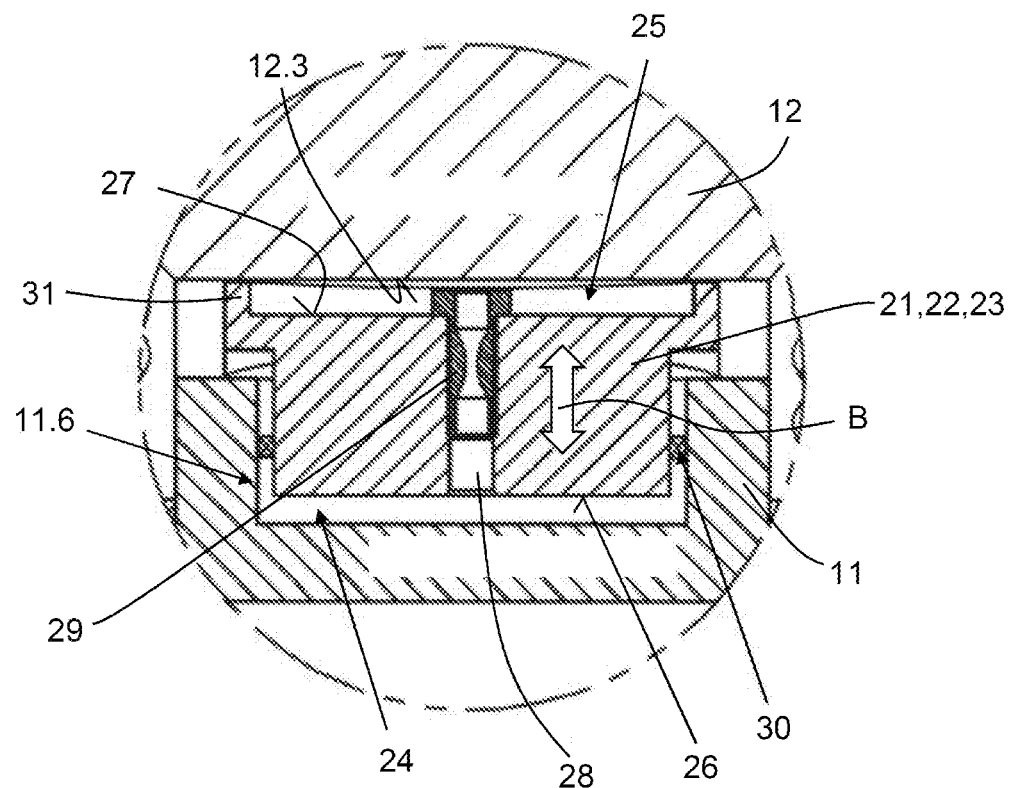
FIG. 8 is a sectional view of a friction bearing segment according to a first exemplary embodiment in a receptacle pocket.

A potential design embodiment of the first friction bearing segment 21 is to be discussed hereunder by means of a friction bearing segment 21, 22, 23 that is shown in an exemplary manner in FIG. 8. The first friction bearing elements 21 are received in the receptacle pocket 11.6 of the first bearing ring 11 in such a manner that a first compression chamber 24 is formed between the first bearing ring 1 and the respective first friction bearing segment 21. Furthermore, the first friction bearing segment 21 is configured in such a manner that a second compression chamber 25 is formed between the fist friction bearing segment 21 and the second bearing ring 12. The second compression chamber is delimited by the second pressure surface 27 of the friction bearing segment 21, a peripheral protrusion 31 that encircles the second pressure surface 27, as well as the friction face 12.3 on the second bearing ring 12. The first compression chamber 24 and the second compression chamber 25 are connected by way of a duct 28 that runs through the first friction bearing segment such that a lubricant exchange is possible between the front side and the rear side of the first friction bearing segment 21. A sealing element 30 is disposed between the first friction bearing segment 21 and the first bearing ring 11. The sealing element 30 lies against an internal contour of the receptacle pocket 11.6 and prevents any undesirable outflow of lubricant from the first compression chamber 24. To this extent, an exchange of lubricant between the first compression chamber 24 and the second compression chamber 25 is possible exclusively by way of the duct 28 of the first friction bearing segment 21. A cross-sectional constriction 29 that is configured as a flow throttle is disposed in the duct 28.

The first friction bearing segment 21 on the rear side thereof comprises a first pressure surface 26 which faces the first compression chamber 24. A second pressure surface 27 which faces the second compression chamber 25 is provided on the front side of the first friction bearing segment. As can be seen by means of the illustration in FIGS. 9 and 10, the first pressure surface 26 is smaller than the second pressure surface 27. A pressure equalization between the first compression chamber 24 and the second compression chamber 25 can take place by way of the duct 28 such that a substantially identical pressure prevails in the first compression chamber 24 and the second compression chamber 25. It now is achieved on account of the dimensioning of the pressure surfaces 26, 27 that the force acting on the second pressure surface 27 is greater than the force which acts on the first pressure surface 26. The first friction bearing segment 21 is therefore pushed away in a self-acting manner from the friction face 12.3 of the second bearing ring 12, on account of which the pressure in the second compression chamber 25 on account of outflowing lubricant decreases until an equilibrium of force between the two forces is reached. To this extent, the friction bearing segment is moved in a movement direction B which is aligned so as to be perpendicular to the friction face 12.3. The friction bearing segment 21 in the state of equilibrium can assume a position at which an adequate lubricant gap is present between the friction bearing segment and the friction face. It can be prevented on account thereof that the friction bearing segment 21 undesirably comes to lie against the friction face 12.3 on the second bearing ring 12, so that a wear-free operation is enabled. The position of the friction bearing segment 21 in the state of equilibrium and/or the width of the lubricant gap can be influenced by the adjustment of the lubricant flow through the infeed 17, the selection of a suitable cross-sectional constriction 29, as well as the mutual ratio of the pressure surfaces 26, 27.

Figure 11:
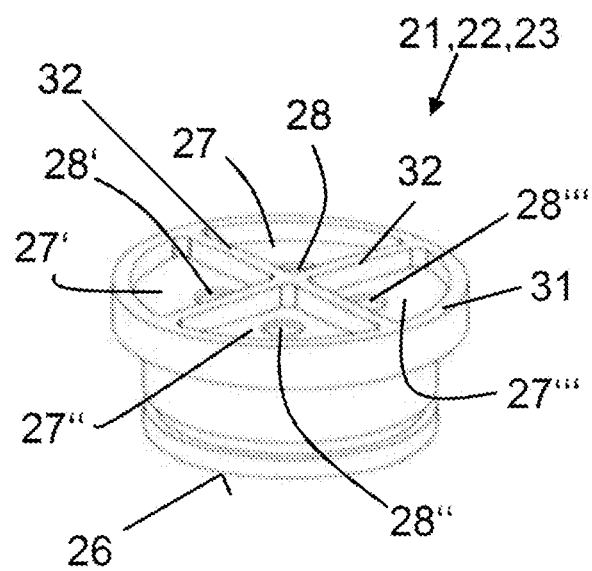
FIG. 11 is a perspective view of a friction bearing segment according to a second exemplary embodiment.

If a plurality of second compression chamber are provided instead of a single second compression chamber 25, the sum of the second pressure surfaces of the plurality of second compression chambers is thus configured so as to be larger than the first pressure surface 26. An embodiment of this type is illustrated in FIG. 11.

Figure 9:
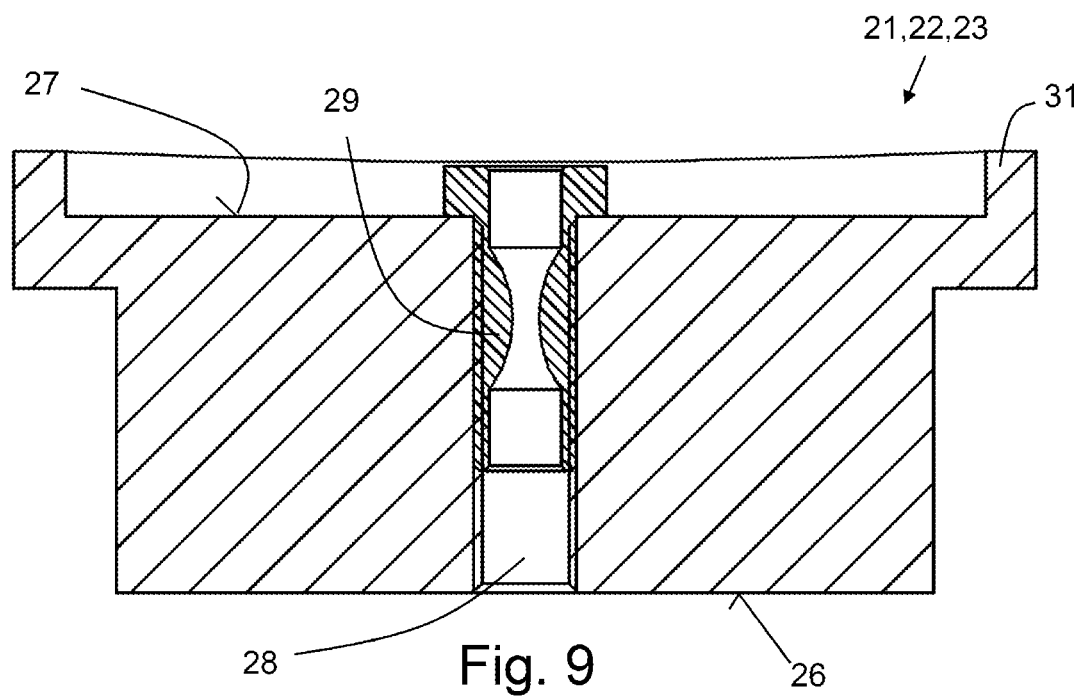
FIG. 9 is a sectional view of the friction bearing segment as per FIG. 8.
Figure 10:
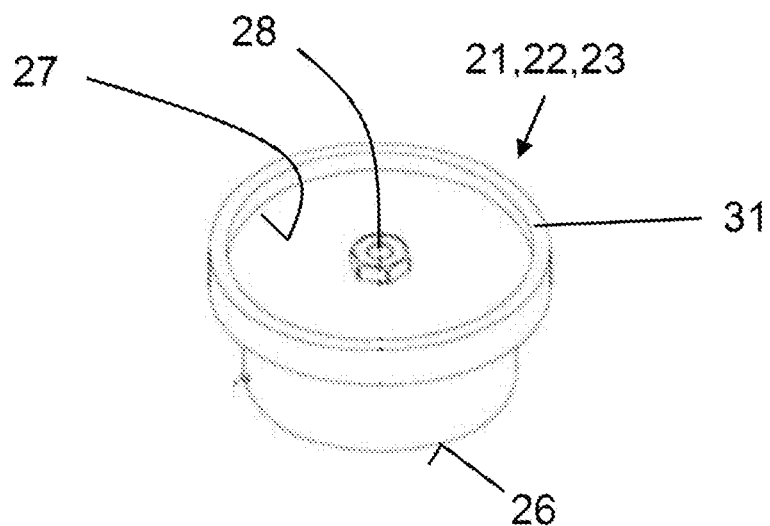
FIG. 10 is a perspective view of the friction bearing segment as per FIG. 8.

The friction bearing segment 21 shown in FIGS. 8, 9, and 10 comprises a circular cross section, that is to say that the first pressure surface 26 and the second pressure surface 27 are circular. Deviating from this design embodiment, the friction bearing segment 21 can comprise another cross section, for example a triangular, quadrangular, or polygonal cross section.

Figure 2:
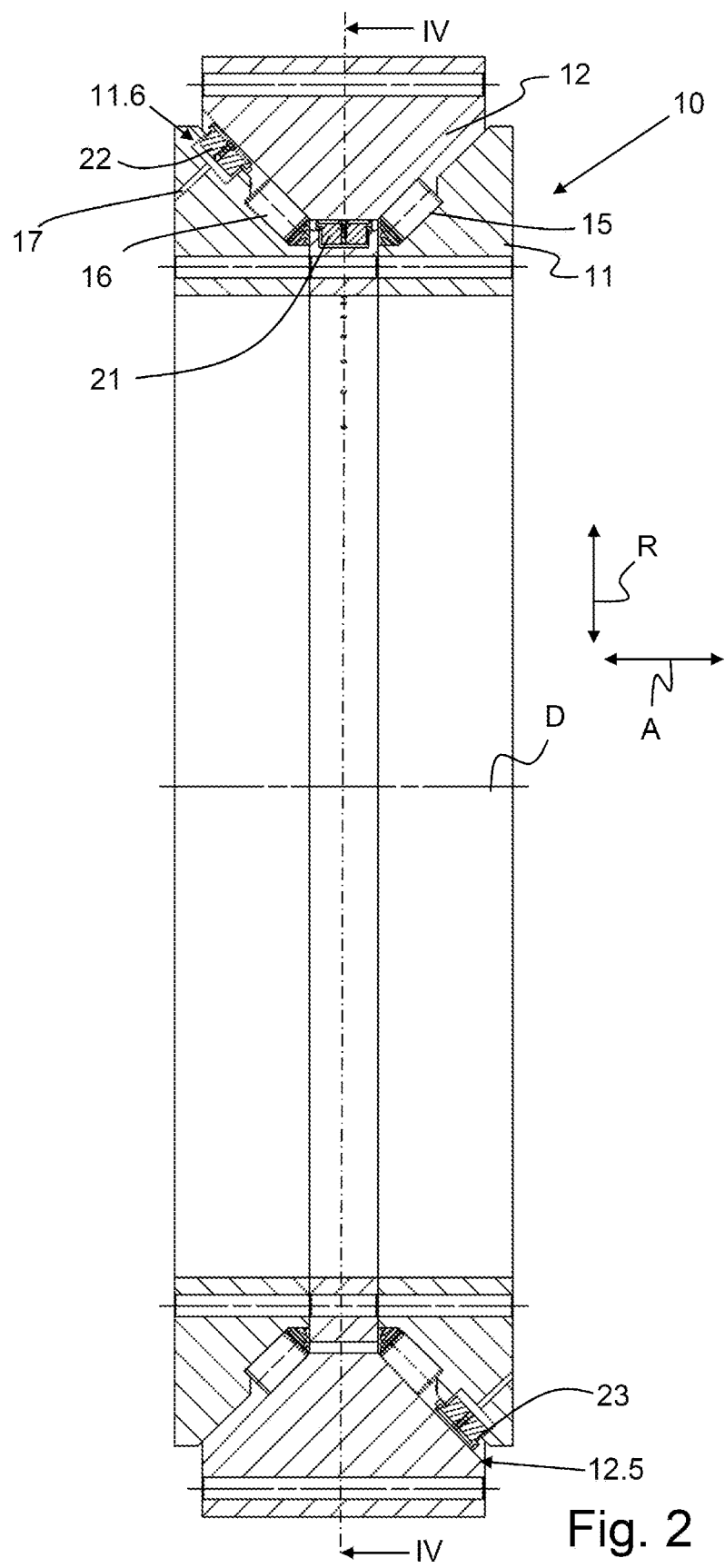
FIG. 2 is a sectional view of a first exemplary embodiment of a bearing assembly along an axial plane that includes the rotation axis.
Figure 3:
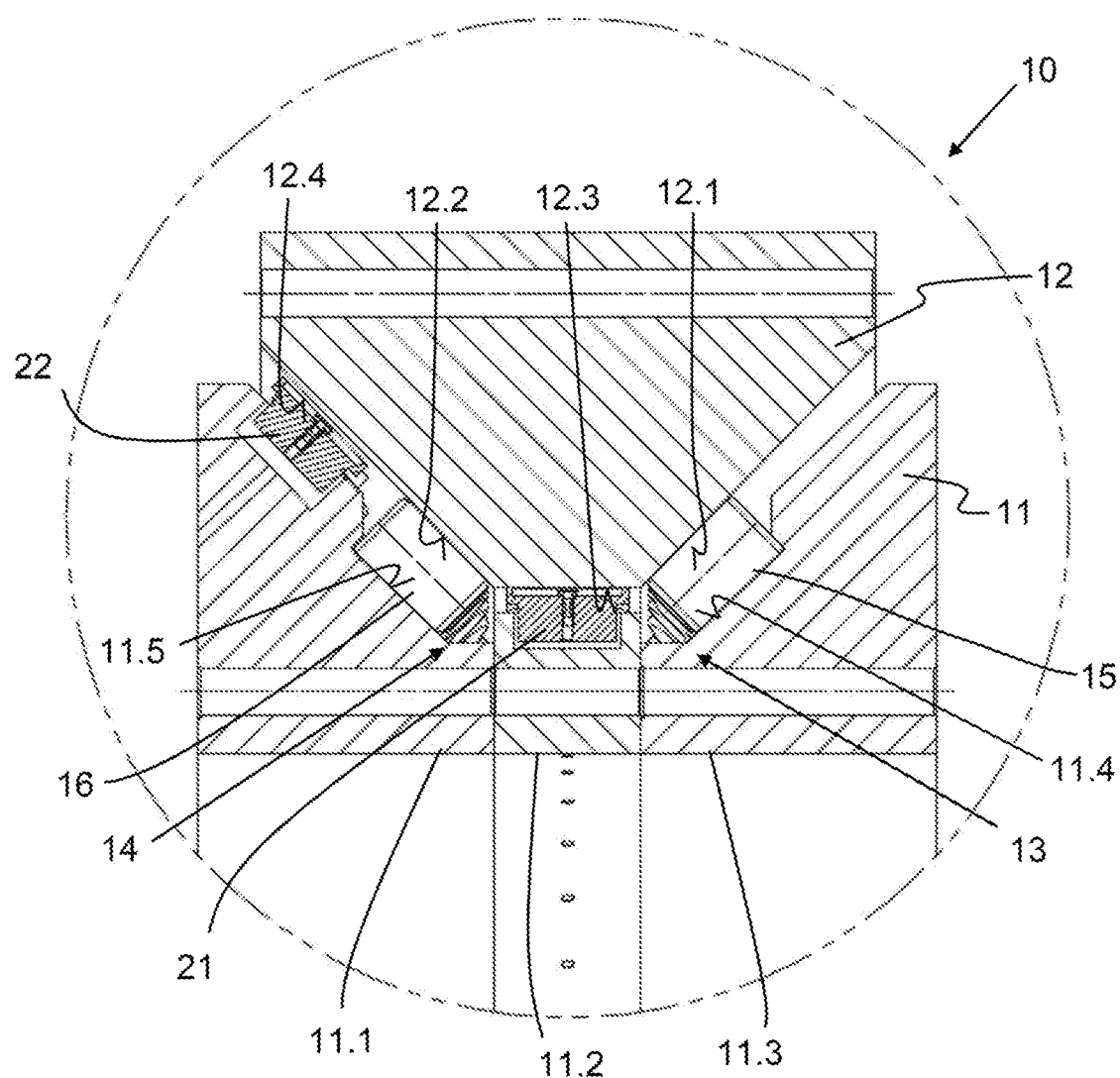
FIG. 3 is a detailed view of the illustration from FIG. 2.

As can be furthermore derived from the illustration in FIGS. 2 and 3, the raceways 12.1, 12.2 of the rows of rolling elements 13, 14 are disposed at an angle in relation to a radial plane, said angle being in the range between 0° and 90°, preferably between 30° and 60°, particularly preferably between 40° and 50°, for example 45°. The first friction face 12.3 is aligned so as to be parallel to the rotation axis D such that forces that act substantially in the radial direction R can be transmitted by way of the first hydrostatic friction bearing segments 21.

Furthermore, a plurality of hydrostatically supported second friction bearing segments 22 of a second row of friction bearing segments as well as a plurality of hydrostatically supported third friction bearing segments 23 of a third row of friction bearing segments are disposed on the first bearing ring 11. The first row of rolling elements 15 is disposed between the first and the third row of friction bearing segments, and the second row of rolling elements is disposed between the first and the second row of friction bearing segments. The second friction bearing segments 22 and the third friction bearing segments 23 are preferably configured so as to be identical to the first friction bearing segments 21 such that the explanations pertaining to FIGS. 8 to 10 also apply to said friction bearing segments. Alternatively, the friction bearing segments 21, 22, 23 of the individual rows of friction bearing segments can be dissimilarly configured. The second friction bearing segments 22 interact with a second friction face 12.4 which is provided on the second bearing ring 12. The third friction bearing segments 23 interact with a third friction face 12.5 of the second bearing ring 12. The second friction face 12.4 and the third friction face 12.5 in relation to a radial plane are disposed at an angle which is identical to the angle which the raceways 12.1, 12.2 enclose in relation to the radial plane. This angle is in the range between 0° and 90°, preferably between 30° and 60°, particularly preferably between 40° and 50°, for example is 45°. To this extent, the second bearing ring 12 comprises a substantially V-shaped or trapezoidal cross section.

In the case of the first exemplary embodiment, first friction bearing segments 21 are mounted so as to be movable in the axial direction R such that the lubricant gap between the friction bearing segment 21 and the friction face 12.3 can be adjusted by a movement of the friction bearing segment 21 along the movement direction. The movement direction is oriented so as to be perpendicular to the first friction face 12.3. The second friction bearing segments 22 and the third friction bearing segments 23 are in each case likewise mounted so as to be movable in a movement direction that is aligned so as to be perpendicular to the respective friction face 12.4, 12.5. The mounting of the friction bearing segments 21, 22, 23 furthermore enables some tilting of the friction bearing segments 21, 22, 23 about a tilting axis which is aligned so as to be perpendicular to the respective movement direction.

Figure 4:
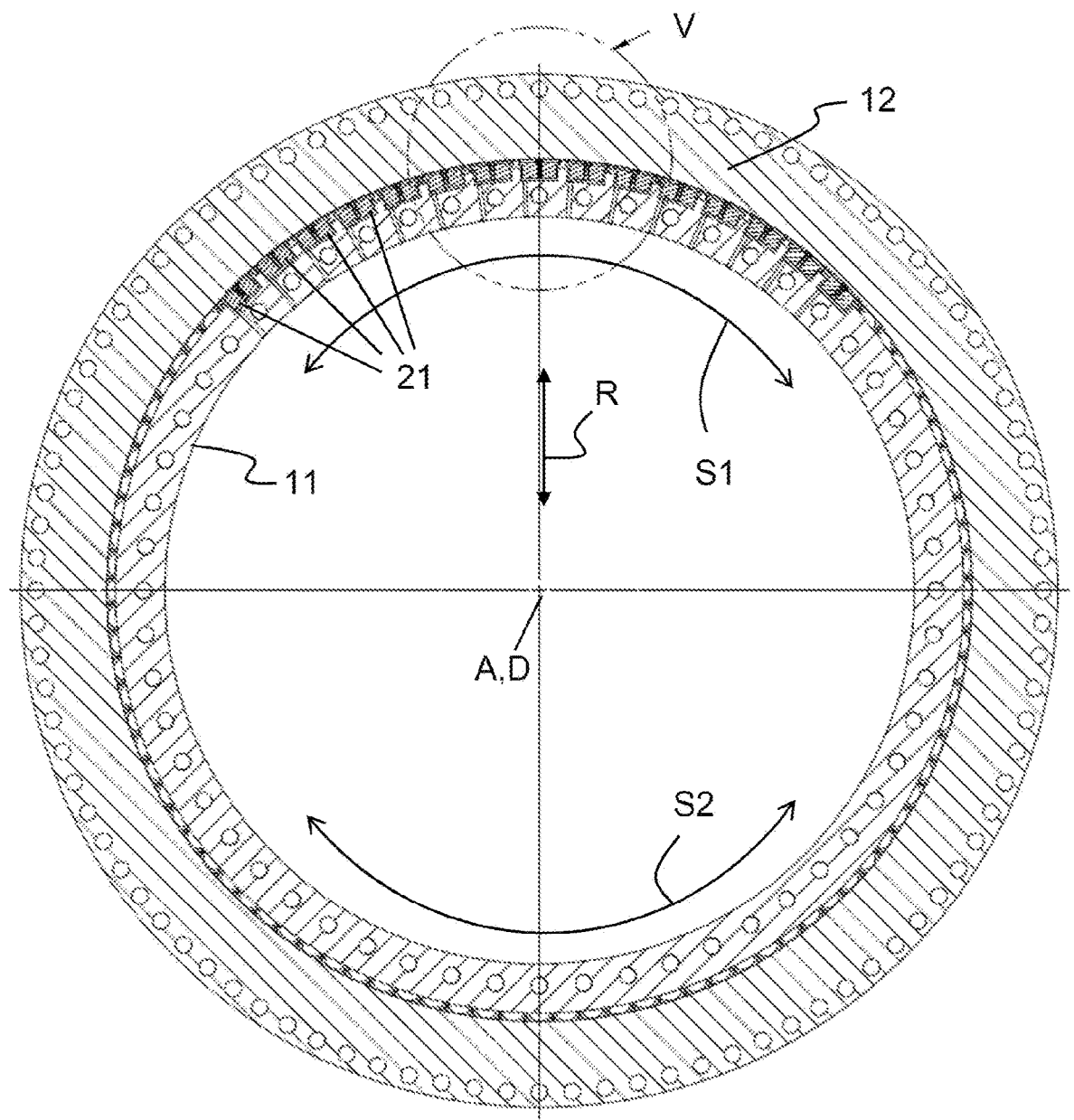
FIG. 4 is a sectional view along the radial plane IV-IV shown in FIG. 2.
Figure 5:
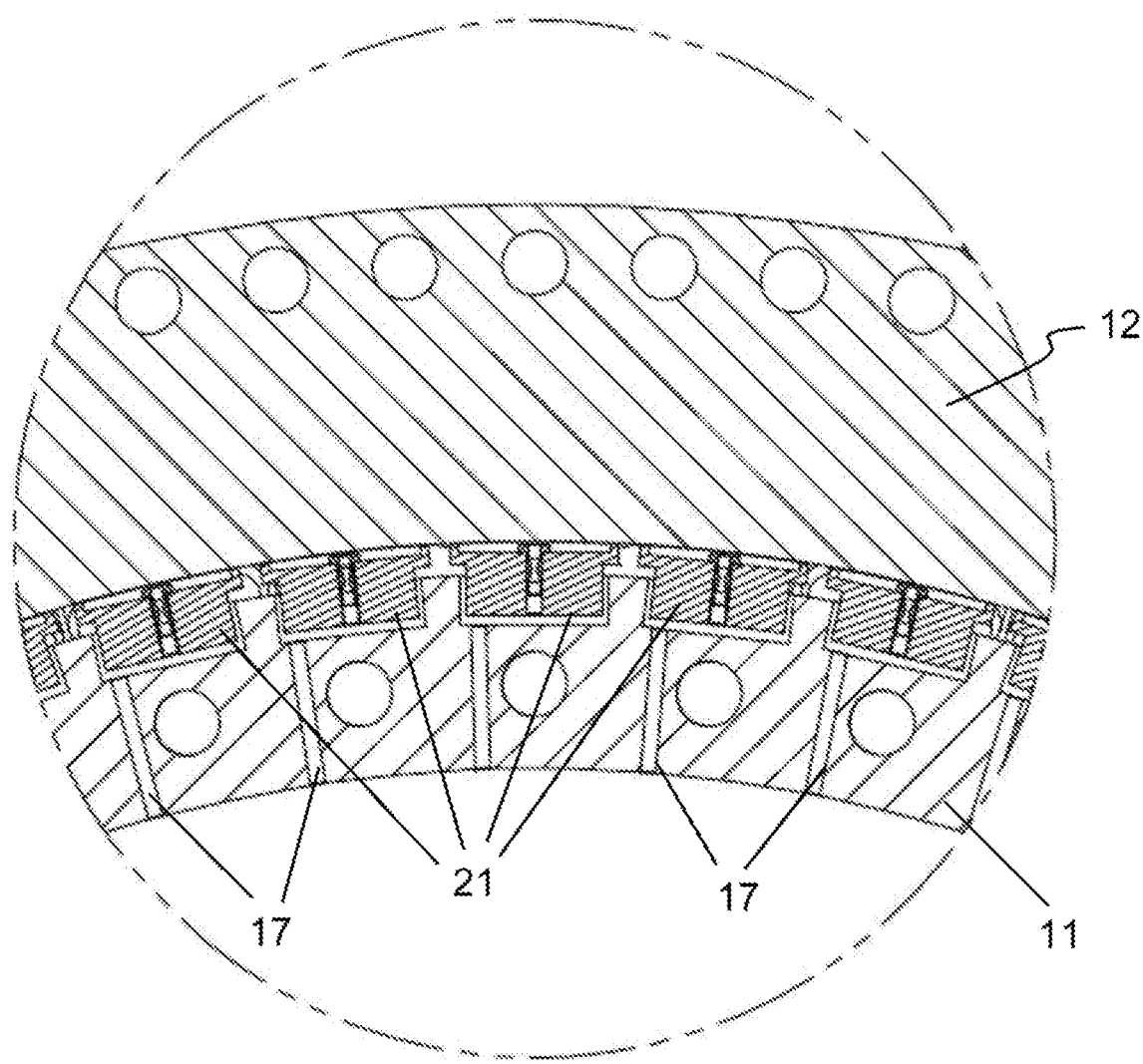
FIG. 5 is a detailed view of the V marked in FIG. 4.

As is shown in the illustrations in FIGS. 4 and 5, the first friction bearing segments 21 along the circumferential direction of the first bearing ring 11 are disposed so as to be distributed in a substantially non-uniform manner across the entire first bearing ring 11. The first bearing ring 11 along the circumferential direction comprises a first annular-segment-shaped region S1 having a plurality of first friction bearing segments 21, said region S1 being shown at the top in FIG. 4. Furthermore provided is a second annular-segment-shaped region S2 in which no friction bearing segments are disposed. The first annular-segment-shaped region S1 having a plurality of first friction bearing segments 21 is preferably disposed in a portion of the first bearing ring 11 in which there is an increased effect of force, for example effect of weight.

The illustration in FIG. 2 highlights that the second friction bearing segments 22 and the third friction bearing segments 23 are disposed so as to be asymmetrical in terms of a radial plane that is disposed so as to be perpendicular to a rotation axis of the bearing assembly. In the case of a stationary disposal of the first bearing ring 11, a design embodiment of this type enables a further adaptation to non-symmetrical effects of forces to be anticipated. The second and the third rows of friction bearing segments comprise in each case a first annular-segment-shaped region in which a plurality of friction bearing segments 22, 23 are disposed, and a second annular-segment-shaped region in which no friction bearing segments are disposed. In the illustration of FIG. 2, the first annular-segment-shaped region of the second row of friction bearing segments is disposed at the top, and the first annular-segment-shaped region of the third row of friction bearing segments is disposed at the bottom.

The first friction bearing segments 21 of the first row of friction bearing segments along the circumferential direction are disposed so as to be distributed uniformly across the entire first bearing ring. The first row of friction bearing segments in the circumferential direction thus extends across the entire first bearing ring 11. The first friction bearing segments 21 are in each case disposed at an identical mutual spacing.

Figure 6:
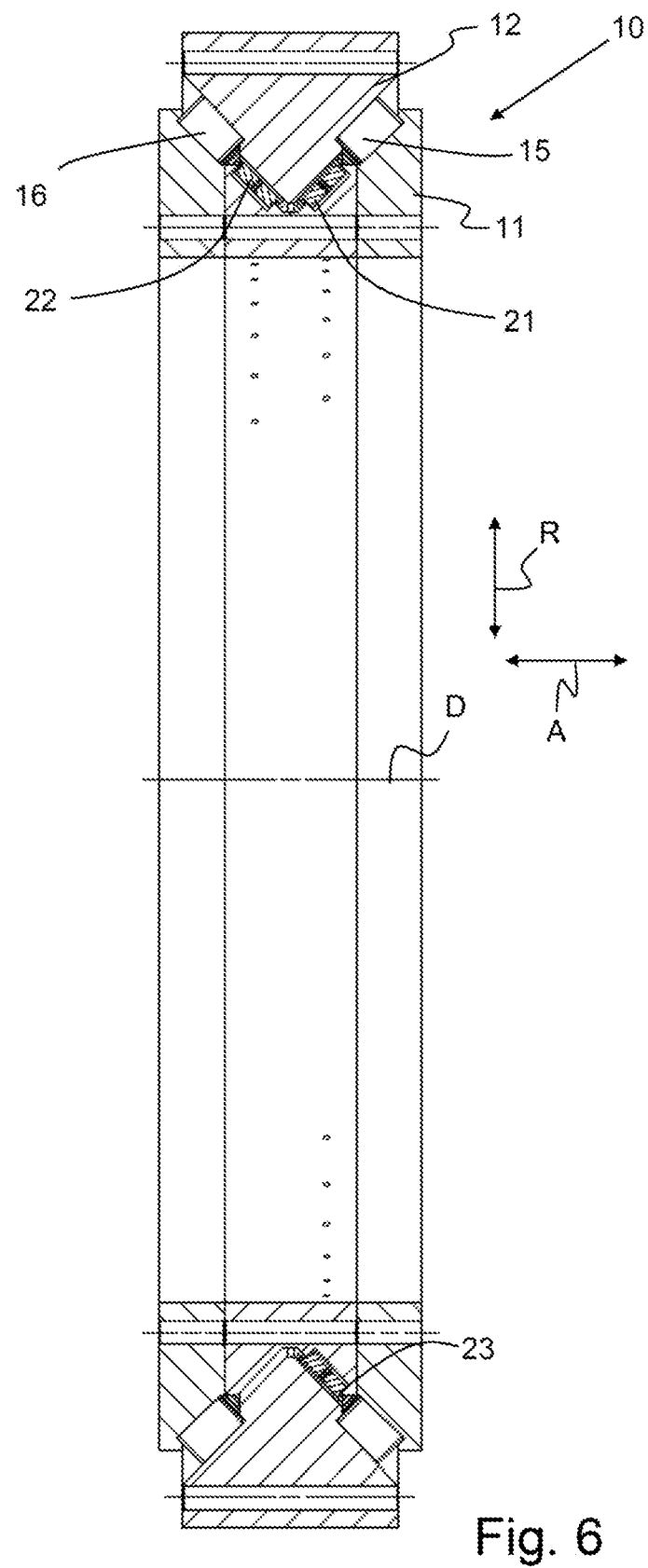
FIG. 6 is a sectional view of a second exemplary embodiment of a bearing assembly along an axial plane that includes the rotation axis.
Figure 7:
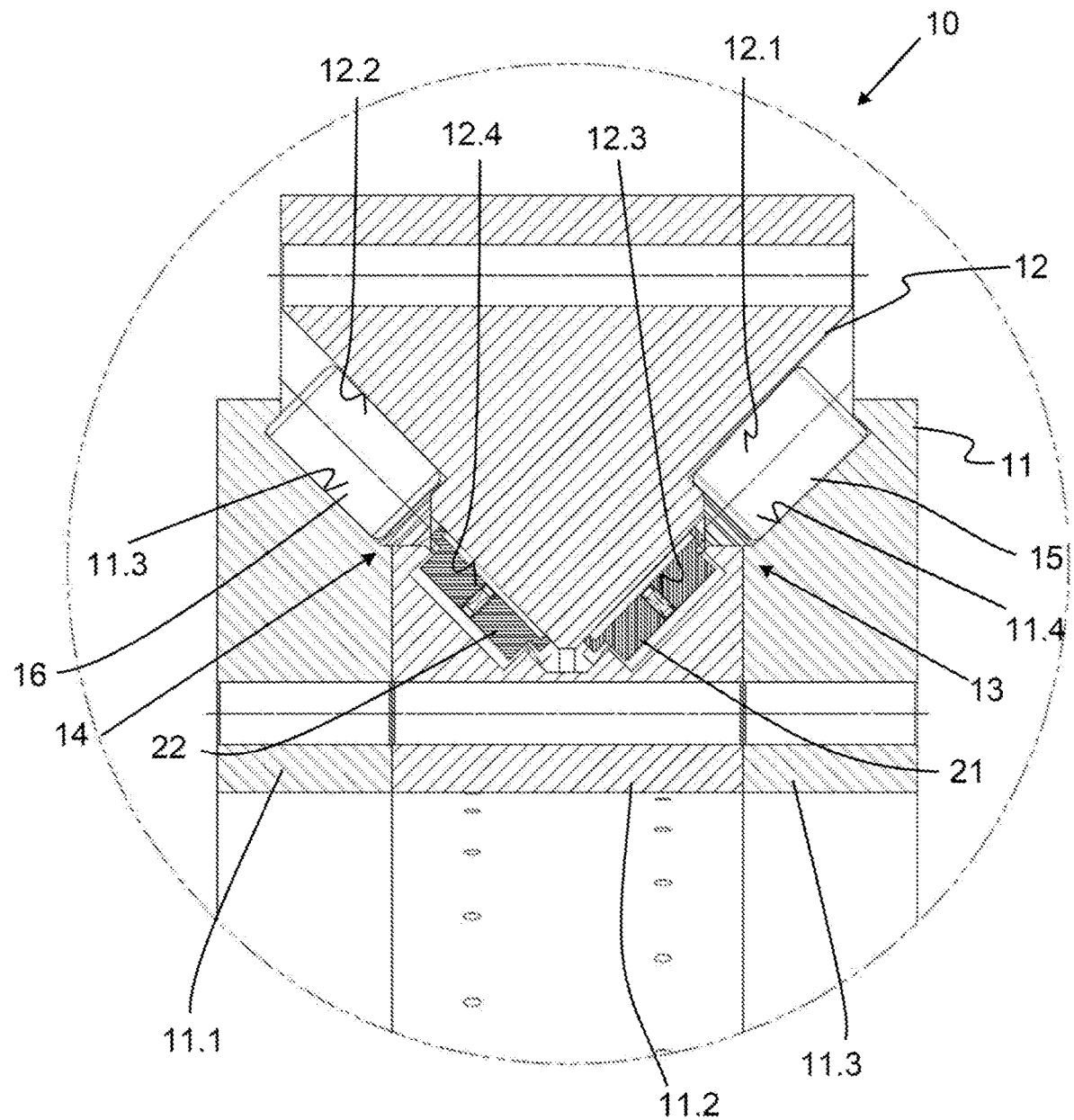
FIG. 7 is a detailed view of the illustration from FIG. 6.

FIGS. 6 and 7 show a second exemplary embodiment of a bearing assembly 10 according to the invention. By contrast to the first exemplary embodiment, the bearing assembly 10 according to the second exemplary embodiment comprises two rows of roller bearings and two rows of friction bearing segments. Both, the first row of friction bearing segments having the first friction bearing segments 21, and the second row of friction bearing segments having the first friction bearing segments 22, are disposed between the rows of roller bearings 13, 14. The first friction bearing segments 21 interact with a first friction face 12.3 of the second bearing ring 12, and the second friction bearing segments 22 interact with a second friction face 12.4. The first friction face 12.3 in relation to a radial plane is disposed at an angle which is identical to the angle which the first raceway 12.1 encloses in relation to the radial plane. The second friction face 12.4 in relation to a radial plane is disposed at an angle which is identical to the angle which the second raceway 12.2 encloses in relation to the radial plane. The value of this angle is in the range between 0° and 90°, preferably between 30° and 60°, particularly preferably between 40° and 50°, for example is 45°. To this extent, the second bearing ring 12 comprises a substantially V-shaped or trapezoidal cross section.

It can be derived from the illustration in FIG. 6 that the first friction bearing segments 21 of the first row of friction bearing segments along the circumferential direction are disposed so as to be distributed uniformly across the entire first bearing ring. The first row of friction bearing segments in the circumferential direction thus extends across the entire first bearing ring 11. The first friction bearing segments 21 are in each case disposed at an identical mutual spacing. The first friction bearing segments 21 and the second friction bearing segments 22 are disposed so as to be asymmetrical in terms of a radial plane that is disposed so as to be perpendicular to a rotation axis of the bearing assembly. The second row of friction bearing segments comprises a first annular-segment-shaped region in which a plurality of friction bearing segments 22 are disposed, and a second annular-segment-shaped region in which no friction bearing segments are disposed. In the illustration of FIG. 6, the first annular-segment-shaped region of the second row of friction bearing segments is disposed at the top, and the second annular-segment-shaped region is disposed at the bottom.

FIG. 11 shows a friction bearing segment 21, 22, 23 according to a second exemplary embodiment in a perspective illustration. As opposed to the friction bearing segment 21, 22, 23 shown in FIGS. 8, 9, and 10, this friction bearing segment 21, 22, 23 is configured in such a manner that a plurality of, in particular four, compression chambers are formed between the friction bearing segment 21, 22, 23 and the second bearing ring 11. Toward the bottom, the individual compression chambers are delimited by four pressure surfaces 27, 27', 27'', 27''', and laterally by the peripheral protrusion 31 as well as further protrusions 32. The pressure surfaces 27, 27', 27'', 27''' are configured in the shape of sectors of a circle. The protrusions 32 divide the upper side of the friction bearing segment 21, 22, 23 into a plurality of, in particular four, sectors of a circle.

On the lower side of the friction bearing segment 21, 22, 23, the individual compression chambers are connected to the first compression chamber 24 by way of a plurality of ducts 28, 28',28'',28''' that run through the friction bearing segment 21, 22, 23. To this extent, each compression chamber on the upper side of the friction bearing element is connected to the first compression chamber 24 by way of exactly one duct 28, 28',28'',28'''. One cross-sectional reduction, in particular a flow throttle, can in each case be disposed within the ducts 28, 28',28'',28'''.

The sum of the pressure surfaces 27, 27', 27'', 27''' is larger than the pressure surface 26 of the first compression chamber 24. It is achieved on account thereof that the force acting on the second pressure surfaces 27, 27', 27'', 27''' is larger than the force which acts on the first pressure surface 26. The friction bearing segment is therefore pushed away in a self-acting manner from the friction face of the second bearing ring, on account of which the pressure in the second compression chamber on account of outflowing lubricant decreases until an equilibrium of force between the two forces is reached. The friction bearing segment in the state of equilibrium can assume a position at which an adequate lubricant gap is present as a separation between the friction bearing segment and the friction face. It can be prevented on account thereof that the friction bearing segment undesirably comes to lie against the friction face on the second bearing ring, so that a wear-free operation is enabled.

The ratio of the first pressure surface 26 to the sum of the plurality of second pressure surfaces 27, 27', 27'', 27''' is less than 1 and is preferably in the range between 0.5 and 1, particularly preferably in the range between 0.7 and 1.

The friction bearing segment 21, 22, 23 shown in FIG. 11 can be used in the bearing assemblies 10 described above and in comparison to the friction bearing segment 21, 22, 23 shown in FIGS. 8, 9, and 10, offers the advantage that the inclination of the friction bearing segment 21, 22, 23 toward tilting in relation to the respective friction face 12.3, 12.4, 12.5 can be reduced.

The bearing assemblies 10 described above in each case have a first bearing ring 11 and a second bearing ring 12 that is mounted so as to be rotatable in relation to the first bearing ring 11, wherein at least one hydrostatically supported first friction bearing segment 21, 22, 23 which interacts with a first friction face 12.3, 12.4, 12.5 that is disposed on the second bearing ring 12 is disposed on the first bearing ring 11, wherein the first friction bearing segment 21, 22, 23 is received in a receptacle pocket 11.6 of the first bearing ring 11 in such a manner that a first compression chamber 24 is formed between the first bearing ring 11 and the first friction bearing segment 21, 22, 23, and the first friction bearing segment 21, 22, 23 is configured in such a manner that a second compression chamber 25 is formed between the first friction bearing segment 21, 22, 23 and the second bearing ring 12, wherein the first compression chamber and the second compression chamber are connected by way of a duct 28 that runs through the first friction bearing segment 21, 22, 23.

In the description above, the use of a definite or indefinite article in conjunction with a noun is also intended to include the plural of the noun, in so far as no mention is made to the contrary. The terms "first", "second", "third", and "fourth" in the description and the claims are intended to enable the differentiation between similar elements and do not describe any specific sequence of said elements. The wording of the "first friction bearing segments", "second friction bearing segments", and "third friction bearing segments" serves in particular only for assigning said friction bearing segments so as to form a row of friction bearing segments. The advantageous design embodiments and features described in the context of one row of friction bearing segments can also be used in the case of the friction bearing segments of the other rows.

LIST OF REFERENCE SIGNS

1 Wind turbine
2 Rotor blade
3 Rotor
4 Nacelle

5 Tower
10 Bearing assembly
11 Bearing ring
11.1, 11.2, 11.3 Bearing ring part
11.4, 11.5 Raceway
11.6 Receptacle pocket
12 Bearing ring
12.1, 12.2 Raceway
12.3, 12.4, 12.5 Friction face
13 Row of rolling elements
14 Row of rolling elements
15 Rolling element
16 Rolling element
17 Infeed
21 Friction bearing segment
22 Friction bearing segment
23 Friction bearing segment
24 Compression chamber
25 Compression chamber
26 Pressure surface
27 Pressure surface
27', 27", 27'" Pressure surface
28 Duct
28',28",28'" Duct
29 Cross-sectional constriction
30 Sealing element
31 Peripheral protrusion
32 Protrusion
A Axial direction
B Movement direction
D Rotation axis
R Radial direction

What is claimed is:

1. A wind turbine, comprising:
a rotor shaft;
a bearing assembly configured to rotatably receive the rotor shaft, the bearing assembly comprising:
a first bearing ring;
a second bearing ring that is mounted to rotate relative to the first bearing ring;
hydrostatically supported first friction bearing segments disposed on the first bearing ring, wherein the hydrostatically supported first friction bearing segments are mutually spaced apart in a circumferential direction of the first bearing ring, the first friction bearing segments interacting with a first friction face that is disposed on the second bearing ring;
wherein each first friction bearing segment is received in a receptacle pocket of the first bearing ring such that a first compression chamber is formed between the first bearing ring and each first friction bearing segment, and each first friction bearing segment is configured such that a second compression chamber is formed between each first friction bearing segment and the second bearing ring, wherein the first compression chamber and the second compression chamber are connected by way of a duct that runs through each first friction bearing segment,
wherein an entirety of each receptacle pocket has a greater width than all portions of the first friction bearing segment that are received in that receptacle pocket,
wherein the hydrostatically supported first friction bearing segments are disposed in a first circumferential region of the first bearing ring, wherein a second circumferential region of the first bearing ring is free of the hydrostatically supported first friction bearing segments, with the first and second circumferential regions being disposed in a same radial plane that is perpendicular to a rotation axis of the bearing assembly,
wherein the second circumferential region has at least the same circumferential width as one of the first friction bearing segments.

2. The wind turbine of claim 1, wherein each first friction bearing segment comprises a first pressure surface which faces the first compression chamber and a second pressure surface or a plurality of second pressure surfaces which face the second compression chamber, wherein the first pressure surface is smaller than the second pressure surface or the sum of the plurality of second pressure surfaces.

3. The wind turbine of claim 2, wherein the second pressure surface of each first friction bearing segment is delimited by a peripheral protrusion.

4. The wind turbine of claim 1, wherein a cross-sectional constriction is formed in each duct.

5. The wind turbine of claim 4, wherein the cross-sectional constriction functions as a flow throttle.

6. The wind turbine of claim 1, including a sealing element disposed between each friction bearing segment and the first bearing ring.

7. The wind turbine of claim 6, wherein each sealing element is disposed in the respective receptacle pocket.

8. The wind turbine of claim 1 wherein each first friction bearing segment is configured such that each second compression chamber comprises numerous chambers that, are formed between each first friction bearing segment and the second bearing ring, wherein each first compression chamber and the numerous chambers of each second compression chamber are respectively connected by a plurality of ducts that run through the respective first friction bearing segment, wherein each first friction bearing segment comprises a first pressure surface that faces the first compression chamber and second pressure surfaces that face the numerous chambers of each of the second compression chambers, wherein with respect to each first friction bearing segment the first pressure surface is smaller than a sum of the second pressure surfaces.

9. The wind turbine of claim 8, wherein a quantity of the numerous chambers of each second compression chamber are only three or four.

10. The wind turbine of claim 8 comprising a cross-sectional constriction in each of the ducts.

11. The wind turbine of claim 1, wherein at least one hydrostatically supported second friction bearing segment, which interacts with a second friction face that is disposed on the second bearing ring, is disposed on the first bearing ring.

12. The wind turbine of claim 1, wherein a plurality of hydrostatically supported second friction bearing segments, which are mutually spaced apart in a circumferential direction of the first bearing ring and interact with a second friction face that is disposed on the second bearing ring, are disposed on the first bearing ring.

13. The wind turbine of claim 1 wherein a width of each first bearing segment is least at a first pressure surface that faces the first compression chamber.

14. The wind turbine of claim 1 wherein the first circumferential region is disposed at a top of the first bearing ring.

15. The wind turbine of claim 1 wherein the second circumferential region extends over at least a quarter of a circumference of the bearing assembly.

16. The wind turbine of claim 1 wherein the bearing assembly comprises a roller bearing.

17. A wind turbine, comprising:
a rotor shaft;
a bearing assembly configured to rotatably receive the rotor shaft, the bearing assembly comprising:
  a first bearing ring;
  a second bearing ring that is mounted to rotate relative to the first bearing ring;
  a hydrostatically supported first friction bearing segment disposed on the first bearing ring, the first friction bearing segment interacting with a first friction face that is disposed on the second bearing ring;
  wherein the first friction bearing segment is received in a receptacle pocket of the first bearing ring such that a first compression chamber is formed between the first bearing ring and the first friction bearing segment, and the first friction bearing segment is configured such that a second compression chamber is formed between the first friction bearing segment and the second bearing ring, wherein the first compression chamber and the second compression chamber are connected by way of a duct that runs through the first friction bearing segment,
  wherein a plurality of hydrostatically supported second friction bearing segments which are mutually spaced apart in a circumferential direction of the first bearing ring and interact with a second friction face that is disposed on the second bearing ring are disposed on the first bearing ring,
  wherein the first friction bearing segments are asymmetric with the second friction bearing segments in terms of a radial plane that is disposed so as to be perpendicular to a rotation axis of the bearing assembly.

18. A wind turbine comprising:
a rotor shaft;
a bearing assembly configured to rotatably receive the rotor shaft, the bearing assembly comprising:
  a first bearing ring;
  a second bearing ring that is mounted to rotate relative to the first bearing ring;
  a hydrostatically supported first friction bearing segment disposed on the first bearing ring, the first friction bearing segment interacting with a first friction face that is disposed on the second bearing ring;
  wherein the first friction bearing segment is received in a receptacle pocket of the first bearing ring such that a first compression chamber is formed between the first bearing ring and the first friction bearing segment, and the first friction bearing segment is configured such that a second compression chamber is formed between the first friction bearing segment and the second bearing ring, wherein the first compression chamber and the second compression chamber are connected by way of a duct that runs through the first friction bearing segment,
  wherein at least one row of rolling elements having a plurality of rolling elements which are disposed so as to roll on a first raceway of the first bearing ring and on a second raceway of the second bearing ring.

* * * * *